US008666418B2

(12) United States Patent
Gao et al.

(10) Patent No.: US 8,666,418 B2
(45) Date of Patent: Mar. 4, 2014

(54) METHOD AND SYSTEM FOR IMPLEMENTING THE SOFT UNLOAD OF MULTI-HOMING CORE NETWORK ELEMENT

(75) Inventors: Shumei Gao, Shenzhen (CN); Jianqiang He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 357 days.

(21) Appl. No.: 13/258,407

(22) PCT Filed: Dec. 24, 2009

(86) PCT No.: PCT/CN2009/075925
§ 371 (c)(1),
(2), (4) Date: Oct. 11, 2011

(87) PCT Pub. No.: WO2010/121476
PCT Pub. Date: Oct. 28, 2010

(65) Prior Publication Data
US 2012/0040680 A1    Feb. 16, 2012

(30) Foreign Application Priority Data

Apr. 24, 2009   (CN) .......................... 2009 1 0106774

(51) Int. Cl.
*H04W 36/00* (2009.01)
(52) U.S. Cl.
USPC .......................................... 455/438; 370/331
(58) Field of Classification Search
CPC ..... H04W 28/02; H04W 16/08; H04W 28/08; H04W 28/10; H04W 28/0289
USPC .......................................... 455/438; 370/331
See application file for complete search history.

(56) References Cited

U.S. PATENT DOCUMENTS

| 2003/0087649 A1 | 5/2003 | Bhatia et al. |
| 2008/0167048 A1* | 7/2008 | Liu et al. ................. 455/445 |
| 2009/0047949 A1* | 2/2009 | Li et al. ................. 455/433 |

FOREIGN PATENT DOCUMENTS

| CN | 1905486 A | 1/2007 |
| CN | 101146316 A | 3/2008 |
| CN | 101166354 A | 4/2008 |
| CN | 101547528 A | 9/2009 |

OTHER PUBLICATIONS

International Search Report in international application No. PCT/CN2009/075925, mailed on Apr. 1, 2010.
English Translation of the Written Opinion of the International Search Authority in international application No. PCT/CN2009/075925, mailed on Apr. 1, 2010.

* cited by examiner

*Primary Examiner* — Amancio Gonzalez
(74) *Attorney, Agent, or Firm* — Oppedahl Patent Law Firm LLC

(57) ABSTRACT

The present invention discloses a method and system for softly unloading a core network element in a multi-homing networking mode, for solving the technical problem of high call loss rate caused by unloading the multi-homing core network element due to reasons like upgrading, failure, or removal. In the present invention, the to-be-unloaded multi-homing core network element is set into an office direction blockage state, and the multi-homing core network element will not be distributed with a new service; and the to-be-unloaded multi-homing core network element is unloaded when the existing services thereon are processed into a predetermined state. The present invention reduces the call loss rate and mitigates the impact on the existing services when the multi-homing core network element needs to be unloaded.

21 Claims, 3 Drawing Sheets

METHOD AND SYSTEM FOR IMPLEMENTING THE SOFT UNLOAD OF MULTI-HOMING CORE NETWORK ELEMENT

TECHNICAL FIELD

The present invention relates to the field of communications, particularly to a method and system for softly unloading a core network element in a multi-homing networking mode.

BACKGROUND

In a Global System of Mobile communication (GSM), generally, one Base Station Controller (BSC) can only connect one Mobile Switch Center (MSC) which can also be called Mobile Switch Center emulator (MSC), as shown in FIG. 1.

BSC multi-homing networking means that one BSC can connect more MSCs, as shown in FIG. 2. A Serving Node Selection Function (SNSF) is responsible for selecting the MSCs, distributing services to each MSC through a certain algorithm for processing and realizing load sharing among the MSCs by dynamically adjusting the distribution, such as A-Flex in the field of Code Division Multiple Access (CDMA) and Iu-Flex in the field of Wideband-CDMA (WCDMA). Generally, the SNSF is set inside the BSC.

Under the BSC multi-homing networking mode, if an MSC fails due to a certain reason, the SNSF will not distribute new services to the MSC, and share and distribute new services of a terminal, which are originally distributed to the MSC, to other MSCs. At the same time, all the existing services on the MSC will be interrupted once the MSC fails.

When a certain MSC is to be subjected to operations such as upgrading or removal or is not needed due to some reasons, this MSC failure will be caused artificially. In this way, new services of a terminal that are originally distributed to the MSC will be redistributed to other MSCs. But all the existing services on the MSC will be interrupted once the MSC fails, then it will cause serious call loss and bring other problems. For example, a terminal originally distributed to the MSC cannot be called until it is autonomously registered with other MSCs.

In the WCDMA, Radio Network Controller (RNC) multi-homing networking means that one RNC connects more Serving General Package Radio Service Support Nodes (SG-SNs); under such networking mode, the above-mentioned problems also exist when a certain SGSN is subjected to upgrading and other operations. The RNC multi-homing networking mode is shown in FIG. 3.

SUMMARY

An objective of the present invention is to provide a method and system for softly unloading a core network element in a multi-homing networking mode, which are used for solving the technical problem of high call loss when the multi-homing core network element needs to be unloaded due to reasons such as upgrading, failure, or removal.

The technical problem of the present invention is solved through the following technical solutions.

A method for softly unloading a multi-homing core network element, comprises:

step A: setting a to-be-unloaded multi-homing core network element into an office direction blockage state and distributing no new service to the multi-homing core network element; and step B: unloading the to-be-unloaded multi-homing core network element when existing services on the to-be-unloaded multi-homing core network element are processed into a predetermined state.

Step A may further comprise: redistributing a new service that is originally distributed to the to-be-unloaded multi-homing core network element to other alternative multi-homing core network elements.

The predetermined state in step B may comprise a state in which a predetermined proportion or predetermined amount of existing services voluntarily initiate a release.

After step B, the method may further comprise:

step C: upgrading the unloaded multi-homing core network element; and step D: setting the upgraded multi-homing core network element into an office direction de-blockage state after upgrading the unloaded multi-homing core network element, and starting receiving a newly distributed service.

The step of setting the to-be-unloaded multi-homing core network element into the office direction blockage state may specifically comprise: recording an office direction state of the to-be-unloaded multi-homing core network element as a blockage state by a Serving Nnode Selection Function (SNSF).

The multi-homing core network element may comprise a mobile switch center or a service GPRS support node.

A system for softly unloading a multi-homing core network element, comprises:

a network controller and a multi-homing core network element; wherein the multi-homing core network element may comprise a to-be-unloaded multi-homing core network element, and the network controller may comprise a Serving Node Selection Function (SNSF);

the serving node selection function may be used for setting the to-be-unloaded multi-homing core network element into an office direction blockage state and distributing no new service to the multi-homing core network element; and the to-be-unloaded multi-homing core network element may be used for processing existing services and may be unloaded when the existing services are processed into a predetermined state.

The multi-homing core network element may further comprise other alternative multi-homing core network elements; and the serving node selection function may be further used for redistributing a new service that is originally distributed to the to-be-unloaded multi-homing core network element to other alternative multi-homing core network elements.

The predetermined state may comprise a state in which a predetermined proportion or predetermined amount of existing services voluntarily initiate a release.

The serving node selection function may be further used for recording the to-be-unloaded multi-homing core network element as a blockage state and setting the to-be-unloaded multi-homing core network element into the office direction blockage state.

The multi-homing core network element may comprise a mobile switch center or a service GPRS support node.

Compared with the prior art, the present invention has the following advantages:

(1) in the present invention, the to-be-unloaded multi-homing core network element will not be unloaded until existing services that are distributed to the to-be-unloaded multi-homing core network element are processed into a predetermined state, where the existing services that are distributed to the to-be-unloaded multi-homing core network element are voluntarily released rather than being released passively due to unloading the to-be-unloaded multi-homing core network element, such that call loss is reduced and the impact on the existing service is mitigated;

(2) in the present invention, a new service that is originally distributed to the to-be-unloaded multi-homing core network element is redistributed to other alternative multi-homing core network elements, such that the services that are needed to be processed by the to-be-unloaded multi-homing core network element are reduced and the unloading speed of the multi-homing core network element is accelerated;

(3) in the present invention, the predetermined state is a state in which a predetermined proportion or predetermined amount of existing services voluntarily initiate the release, and it may be set such that all the existing services are completely executed or the existing services are in a small acceptable range; uploading at this point may control the call loss to be zero or in a very small range;

(4) in the present invention, the multi-homing core network element is upgraded smoothly, without impact on a newly established service, and its impact on the currently existing services may be reduced to the minimum or even zero;

(5) in the present invention, setting the to-be-unloaded multi-homing core network element into an office direction blockage state is implemented by recording an office direction state of the to-be-unloaded multi-homing core network element as a blockage state by the Serving Node Selection Ffunction (SNSF), without signaling interactions between the SNSF and the to-be-unloaded multi-homing core network element; and (6) the present invention may be applied to a core network element of a mobile switch center, a service GPRS support node or other multi-homing networking modes.

DETAILED DESCRIPTION

Figure 1:
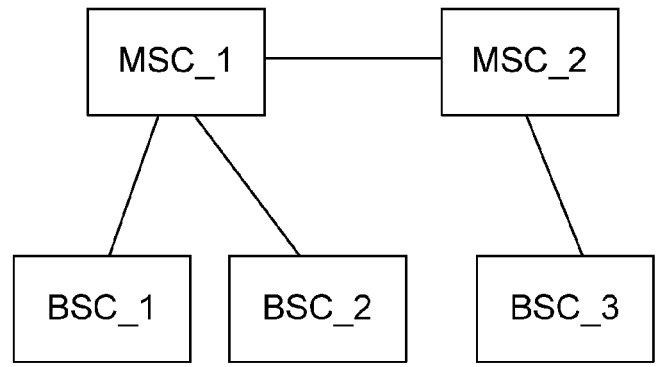
FIG. 1 shows a BSC general networking mode.
Figure 2:
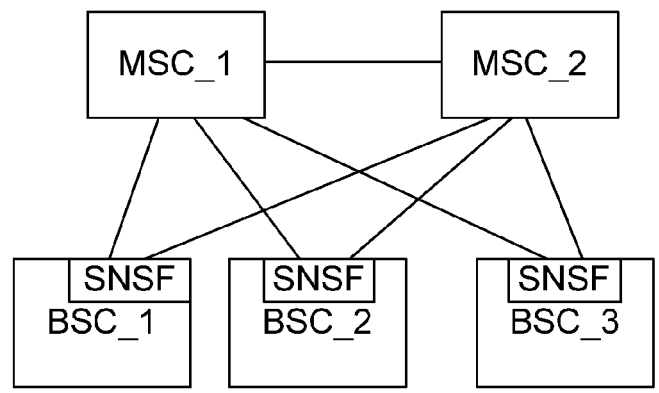
FIG. 2 shows a BSC multi-homing networking mode.
Figure 3:
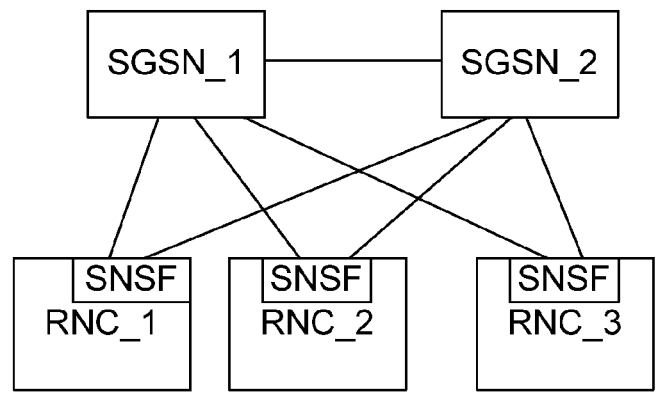
FIG. 3 shows an RNC multi-homing networking mode.

Hereinafter, the present invention is further described in detail with reference to preferred embodiments in conjunction with the drawings.

A system for softly unloading a multi-homing core network element according to one embodiment of the present invention comprises a network controller and a multi-homing core network element. The network controller may specifically be a BSC or RNC; and the multi-homing core network element comprises a to-be-unloaded multi-homing core network element and other alternative multi-homing core network elements, such as a core network element of an MSC, SGSN, GSM or other multi-homing networking modes. The network controller comprises a Serving Node Selection Function (SNSF) that may be set inside the BSC or RNC, or set separately. For example, when the multi-homing core network element is a core network element of the MSC, the network controller is the BSC; and when the multi-homing core network element is a core network element of the SGSN, the network controller is the RNC. The SNSF is used for setting the to-be-unloaded multi-homing core network element into an office direction blockage state, redistributing a new service that is originally distributed to the to-be-unloaded multi-homing core network element to other alternative multi-homing core network elements, and distributing no new service to the to-be-unloaded multi-homing core network element. The SNSF sets the to-be-unloaded multi-homing core network element into the office direction blockage state specifically by recording an office direction state of the to-be-unloaded multi-homing core network element as a blockage state. The to-be-unloaded multi-homing core network element is used for processing an existing service and is unloaded when the existing service is processed into a predetermined state. The predetermined state comprises a state in which a predetermined proportion or predetermined amount of existing services voluntarily initiate a release. For example, the services on a to-be-upgraded element are zero or the unprocessed services accounts for a very small percentage that is within an acceptable range.

A method for softly unloading a multi-homing core network element in the present invention, which may take the example of upgrading an MSC, comprises: setting a to-be-unloaded multi-homing core network element of the MSC into an office direction blockage state, distributing no new service to the MSC, and unloading the MSC when existing services on the MSC are processed into a predetermined state, wherein the predetermined state may be a state in which the services are completely processed or a predetermined proportion or predetermined amount of existing services voluntarily initiate a release.

A method for softly unloading a multi-homing core network element in the present invention, which may also take the example of removing a multi-homing core network element of an SGSN, comprises: setting a to-be-unloaded multi-homing core network element of the SGSN into an office direction blockage state, distributing no new service to the SGSN, and unloading the SGSN when existing services on the SGSN are processed into a predetermined state.

Figure 4:
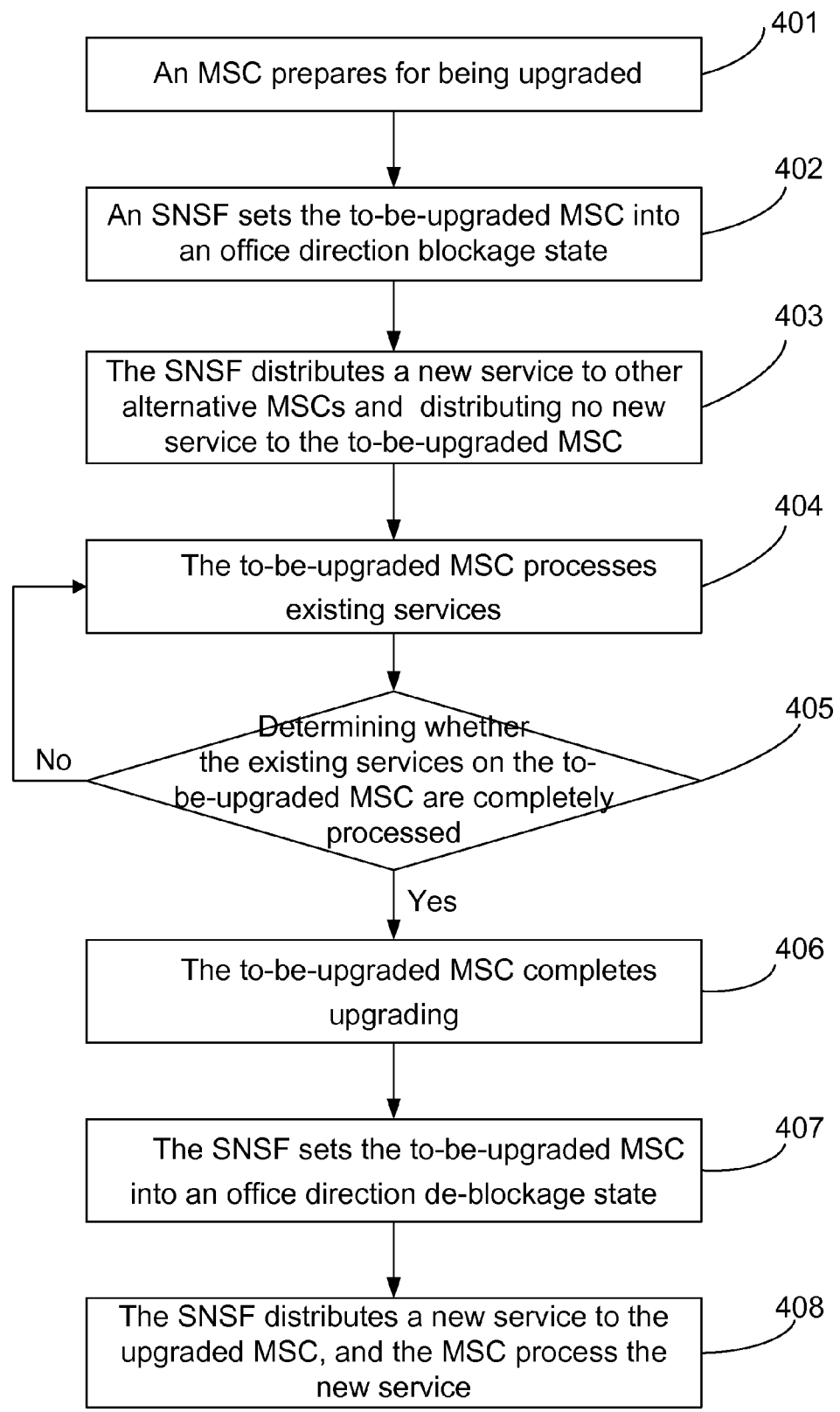
FIG. 4 is a flowchart for softly unloading and subsequent loading an MSC when the MSC is upgraded according to one embodiment of the present invention.

A method for softly unloading a multi-homing core network element according to one embodiment of the present invention, as shown in FIG. 4, with upgrading a multi-homing core network element of an MSC and the predetermined state being completely processing the existing services as an example to illustrate softly unloading the MSC and its subsequent loading process, comprises the following steps.

Step S401: an MSC prepares for being upgraded.

Step S402: an SNSF manages an office direction blockage and de-blockage states of the MSC for a certain time in advance, and marks the MSC as the office direction blockage state, wherein the certain time in advance may be set as required.

Step S403: when selecting an MSC for distributing a service, the MSC in the office direction blockage state is not in the range of selection, and the SNSF distributes the new service to other alternative MSCs, and at this point, the SNSF does not distribute the new service to the to-be-upgraded MSC.

Step S404: the to-be-graded MSC processes existing services, wherein the existing services on the to-be-graded MSC will be gradually released over time, thus the services on the to-be-upgraded MSC will be decreased gradually.

Step S405: determining whether the existing services on the to-be-upgraded MSC are completely processed; if yes, executing step S406; otherwise, executing step S404.

Step S406: the to-be-upgraded MSC completes upgrading.

Step S407: the SNSF manages the office direction blockage and de-blockage states of the MSC and marks the MSC as the office direction de-blockage state.

Step S408: when selecting an MSC for distributing services, the SNSF distributes the service to the de-blocked MSC through a certain algorithm and distributes a new service to the upgraded MSC which processes the new service.

Figure 5:
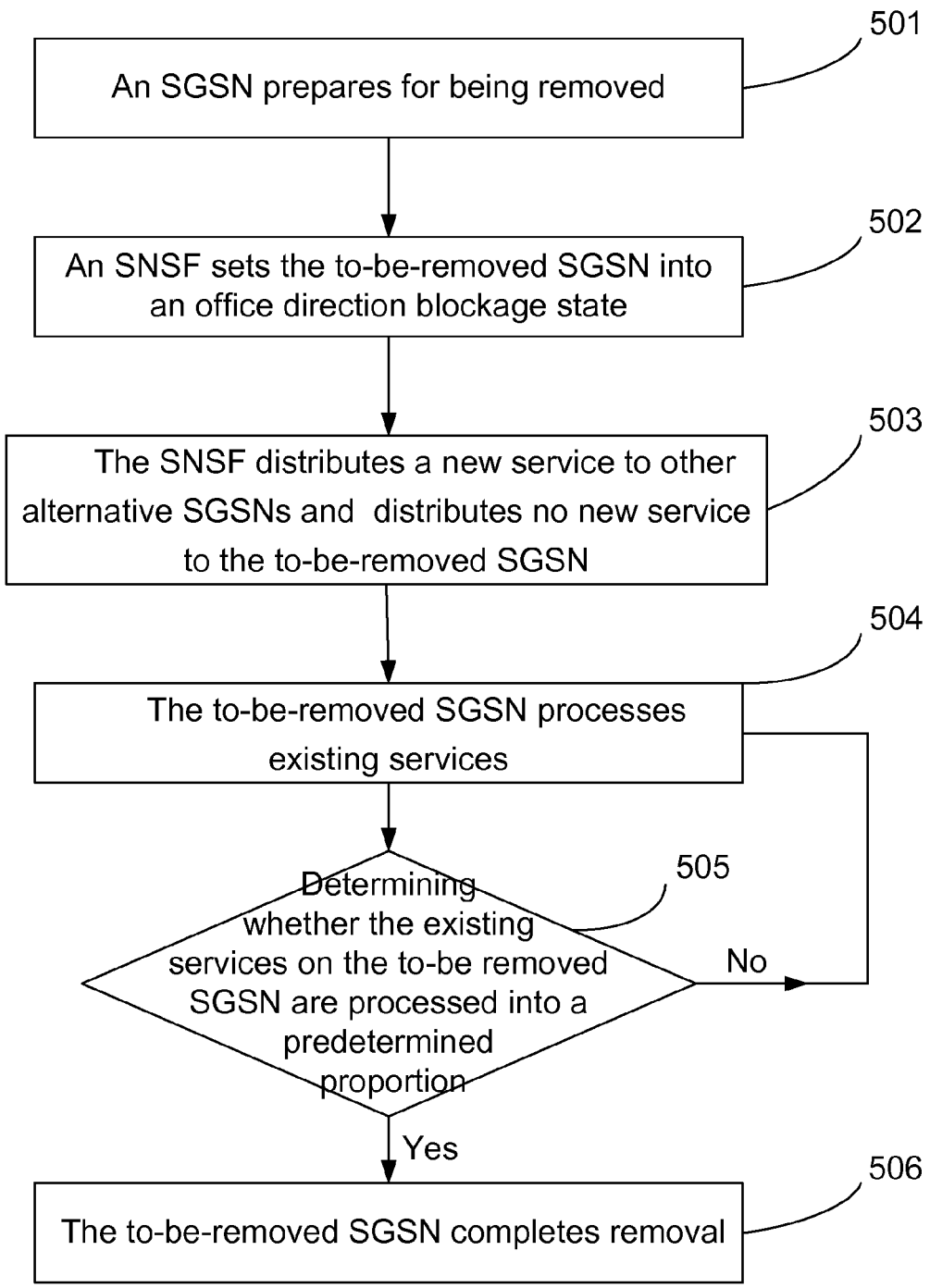
FIG. 5 is a flowchart for softly unloading an SGSN when the SGSN is removed according to one embodiment of the present invention.

A method for softly unloading a element according to another embodiment of the present invention, as shown in FIG. 5, in the field of the WCDMA, with SGSN preparing for removal and the predetermined state being processing the existing services into a predetermined proportion as an example to illustrate softly unloading the SGSN and its subsequent loading process, comprises the following steps.

Step S501: an SGSN prepares for being removed.

Step S502: an SNSF manages an office direction blockage and de-blockage states of the SGSN for a certain time in advance, and marks the SGSN as the office direction blockage state, wherein the certain time in advance may be set as required.

Step S503: when selecting an SGSN for distributing a service, the SGSN in the office direction blockage state is not in the range of selection, and the SNSF distributes the new service to other alternative SGSNs, and at this point, the SNSF does not distribute the new service to the to-be-removed SGSN.

Step S504: the to-be-removed SGSN processes existing services, wherein the existing services on the to-be-removed SGSN will be gradually released over time, thus the services on the to-be-removed SGSN will be decreased gradually.

Step S505: determining whether the existing services on the to-be-removed SGSN are processed into a predetermined proportion; if yes, executing step S506; otherwise, executing step S504.

Step S506: the to-be-removed SGSN completes removal.

What is described above is further detailed description of the present invention with reference to specific preferred embodiments, and the scope of the present invention should not be construed as being limited to the embodiments set forth herein. Various simple deductions or replacements that may be made by those skilled in the art without departing from the concept of the present invention should be regarded as falling within the protection scope of the present invention.

What is claimed is:

1. A method for softly unloading a multi-homing core network element, comprising:
   setting a to-be-unloaded multi-homing core network element into an office direction blockage state and distributing no new service to the multi-homing core network element; and
   unloading the to-be-unloaded multi-homing core network element when existing services on the to-be-unloaded multi-homing core network element are processed into a predetermined state.

2. The method according to claim 1, after setting the to-be-unloaded multi-homing core network element into the office direction blockage state, the method further comprising: redistributing a new service that is originally distributed to the to-be-unloaded multi-homing core network element to other alternative multi-homing core network elements.

3. The method according to claim 1, wherein the predetermined state comprises a state in which a predetermined proportion or predetermined amount of existing services voluntarily initiate a release.

4. The method according to claim 1, after unloading the to-be-unloaded multi-homing core network element, the method further comprising:
   upgrading the unloaded multi-homing core network element; and
   setting the upgraded multi-homing core network element into an office direction de-blockage state after upgrading the unloaded multi-homing core network element, and starting receiving a newly distributed service.

5. The method according to claim 1, wherein the step of setting the to-be-unloaded multi-homing core network element into the office direction blockage state specifically comprises: recording an office direction state of the to-be-unloaded multi-homing core network element as a blockage state by a Serving Nnode Selection Function (SNSF).

6. The method according to claim 1, wherein the multi-homing core network element comprises a mobile switch center or a service GPRS support node.

7. A system for softly unloading a multi-homing core network element, comprising:
   a network controller and a multi-homing core network element; wherein the multi-homing core network element comprises a to-be-unloaded multi-homing core network element, and the network controller comprises a Serving Node Selection Function (SNSF);
   the serving node selection function is used for setting the to-be-unloaded multi-homing core network element into an office direction blockage state and distributing no new service to the multi-homing core network element; and
   the to-be-unloaded multi-homing core network element is used for processing existing services and is unloaded when the existing services are processed into a predetermined state.

8. The system according to claim 7, wherein the multi-homing core network element further comprises other alternative multi-homing core network elements; and the serving node selection function is further used for redistributing a new service that is originally distributed to the to-be-unloaded multi-homing core network element to other alternative multi-homing core network elements.

9. The system according to claim 7, wherein the predetermined state comprises a state in which a predetermined proportion or predetermined amount of existing services voluntarily initiate a release.

10. The system according to claim 7, wherein the serving node selection function is further used for recording the to-be-unloaded multi-homing core network element as a blockage state and setting the to-be-unloaded multi-homing core network element into the office direction blockage state.

11. The system according to claim 7, wherein the multi-homing core network element comprises a mobile switch center or a service GPRS support node.

12. The method according to claim 2, wherein the step of setting the to-be-unloaded multi-homing core network element into the office direction blockage state specifically comprises: recording an office direction state of the to-be-unloaded multi-homing core network element as a blockage state by a Serving Nnode Selection Function (SNSF).

13. The method according to claim 3, wherein the step of setting the to-be-unloaded multi-homing core network element into the office direction blockage state specifically comprises: recording an office direction state of the to-be-unloaded multi-homing core network element as a blockage state by a Serving Nnode Selection Function (SNSF).

14. The method according to claim 4, wherein the step of setting the to-be-unloaded multi-homing core network element into the office direction blockage state specifically comprises: recording an office direction state of the to-be-unloaded multi-homing core network element as a blockage state by a Serving Nnode Selection Function (SNSF).

15. The method according to claim 2, wherein the multi-homing core network element comprises a mobile switch center or a service GPRS support node.

16. The method according to claim 3, wherein the multi-homing core network element comprises a mobile switch center or a service GPRS support node.

17. The method according to claim 4, wherein the multi-homing core network element comprises a mobile switch center or a service GPRS support node.

18. The system according to claim 8, wherein the serving node selection function is further used for recording the to-be-unloaded multi-homing core network element as a blockage state and setting the to-be-unloaded multi-homing core network element into the office direction blockage state.

19. The system according to claim 9, wherein the serving node selection function is further used for recording the to-be-unloaded multi-homing core network element as a blockage state and setting the to-be-unloaded multi-homing core network element into the office direction blockage state.

20. The system according to claim 8, wherein the multi-homing core network element comprises a mobile switch center or a service GPRS support node.

21. The system according to claim 9, wherein the multi-homing core network element comprises a mobile switch center or a service GPRS support node.

* * * * *